United States Patent [19]
Borris et al.

[11] Patent Number: 6,123,169
[45] Date of Patent: Sep. 26, 2000

[54] PRE-ENGINEERED VERTICAL WALL STRUCTURE CONSTRUCTED ENTIRELY OR PREFABRICATED WOOD

[75] Inventors: Timothy R. Borris; Barry W. Holden, both of Washington, Ga.

[73] Assignee: Hoover Treated Wood Products, Thomson, Ga.

[21] Appl. No.: 09/259,098

[22] Filed: Feb. 26, 1999

[51] Int. Cl.[7] .............................. B64F 1/26; E04H 17/00; G10K 11/00

[52] U.S. Cl. ......................... 181/210; 181/284; 52/276; 52/278; 52/144; D25/38; D25/42; D25/43; D25/44

[58] Field of Search ..................................... 181/210, 284, 181/285, 286, 287, 294, 175; 52/155, 156, 276, 277, 278, 144, 145; D25/38, 42, 43, 44, 55, 58, 59, 60, 61

[56] References Cited

U.S. PATENT DOCUMENTS

| | | | |
|---|---|---|---|
| 2,808,136 | 10/1957 | Hammitt et al. | 189/34 |
| 3,111,303 | 11/1963 | Olson | 256/19 |
| 3,140,564 | 7/1964 | Chapman | 50/101 |
| 3,167,823 | 2/1965 | Palfey | 20/56.5 |
| 3,707,062 | 12/1972 | Joiner, Jr. | 52/741 |
| 4,325,457 | 4/1982 | Docherty et al. | 181/210 |
| 4,402,384 | 9/1983 | Smith et al. | 181/210 |
| 4,674,593 | 6/1987 | McCarty | 181/210 |
| 5,539,163 | 7/1996 | Anderson et al. | 181/210 |
| 5,689,927 | 11/1997 | Knight, Sr. | 52/297 |
| 5,965,852 | 10/1999 | Roschke | 181/210 |
| 5,984,044 | 11/1999 | Christensen | 181/210 |

*Primary Examiner*—Paul Ip
*Assistant Examiner*—Edgardo San Martin
*Attorney, Agent, or Firm*—Harness, Dickey & Pierce, P.L.C.

[57] ABSTRACT

An out-of-doors prefabricated, pre-engineered vertical wall structure constructed entirely of pressure treated wood and comprised of successive individual wall sections tightly arranged in an end-to-end pattern. Supporting rectangular posts join immediately adjacent wall sections together end-to-end and occupy the entire space between the sections, each of the posts having flat surfaces facing the ends of immediately adjacent wall sections on opposite sides of the post with upright pairs of spaced cants secured to said flat surfaces so as to form upright channels extending upwardly from top to bottom on the posts, each pair of cants being spaced apart to receive one end of one of said wall sections in a tight relation between said cants.

2 Claims, 2 Drawing Sheets

PRE-ENGINEERED VERTICAL WALL STRUCTURE CONSTRUCTED ENTIRELY OR PREFABRICATED WOOD

BACKGROUND AND SUMMARY OF THE INVENTION

This invention relates to a vertical wall structure that is pre-engineered and prefabricated so that it can be constructed on the site where a sound barrier or a visual screen is desired. The wall structure is made of prefabricated wood which gives off a warm, natural appearance. Unlike concrete or masonry walls, there is no "prison wall" feeling associated with the present out-of-doors wall structure. Applicant's wall structure is neighborly because it is identical in appearance and attractiveness from either side with no unsightly backside. In spite of its lighter weight, the present wall structure functions to reduce noise as well as solid concrete or masonry competing structures.

Applicant's wall structure is constructed entirely of a pressure treated wood which is easy to install, economical and aesthetically pleasing. It's ready to install when delivered and requires no concrete footings, heavy equipment or special skills for installation.

The wall structure of this invention consists almost entirely of posts and panels of prefabricated pressure treated wood which can be erected at the site so as to enjoy the advantages of the "sandwich" construction. By virtue of this construction, the panels can be made so that they are relatively thick, for example, 2½" to 3" thick and they are secured to the posts in channels created by pressure treated 4"×4" "cants" (4×4's ripped diagonally prior to treatment) that are spiked to the posts. The panels consist of plywood faces and pressure treated lumber in between the faces. The tough plywood faces provide a stiff structural skin to enable the panels to resist high wind loads. The posts are embedded in the ground to a depth of at least one half of the exposed height of the wall structure and backfilled with crushed stone.

The effectiveness of any noise barrier is determined by many factors. Two of the most important are noise, leaks (openings), and mass (weight). In applicant's wall structure, the panels are free of noise leaks because of their two-sided covering of dimensionally stable pressure treated wood. In addition to being free of noise leaks, Applicant's wall structure has sufficient mass to produce the same field noise reduction as much heavier and expensive concrete and masonry barriers. The minimum panel mass to assure good acoustic performance is 4 lbs./sq.ft. Applicant's panels weight considerably more, 5.5 lbs/sq.ft, which assures good acoustical performance.

The foregoing features, advantages and benefits of the present invention, along with additional ones, will be seen in the ensuing description and claims which should be considered in conjunction with the accompanying drawings wherein like reference numerals designate like parts. The drawings disclose presently preferred embodiments of the invention in accordance with the best mode presently contemplated for carrying out the invention.

DESCRIPTION OF THE PREFERRED EMBODIMENT

Figure 1:
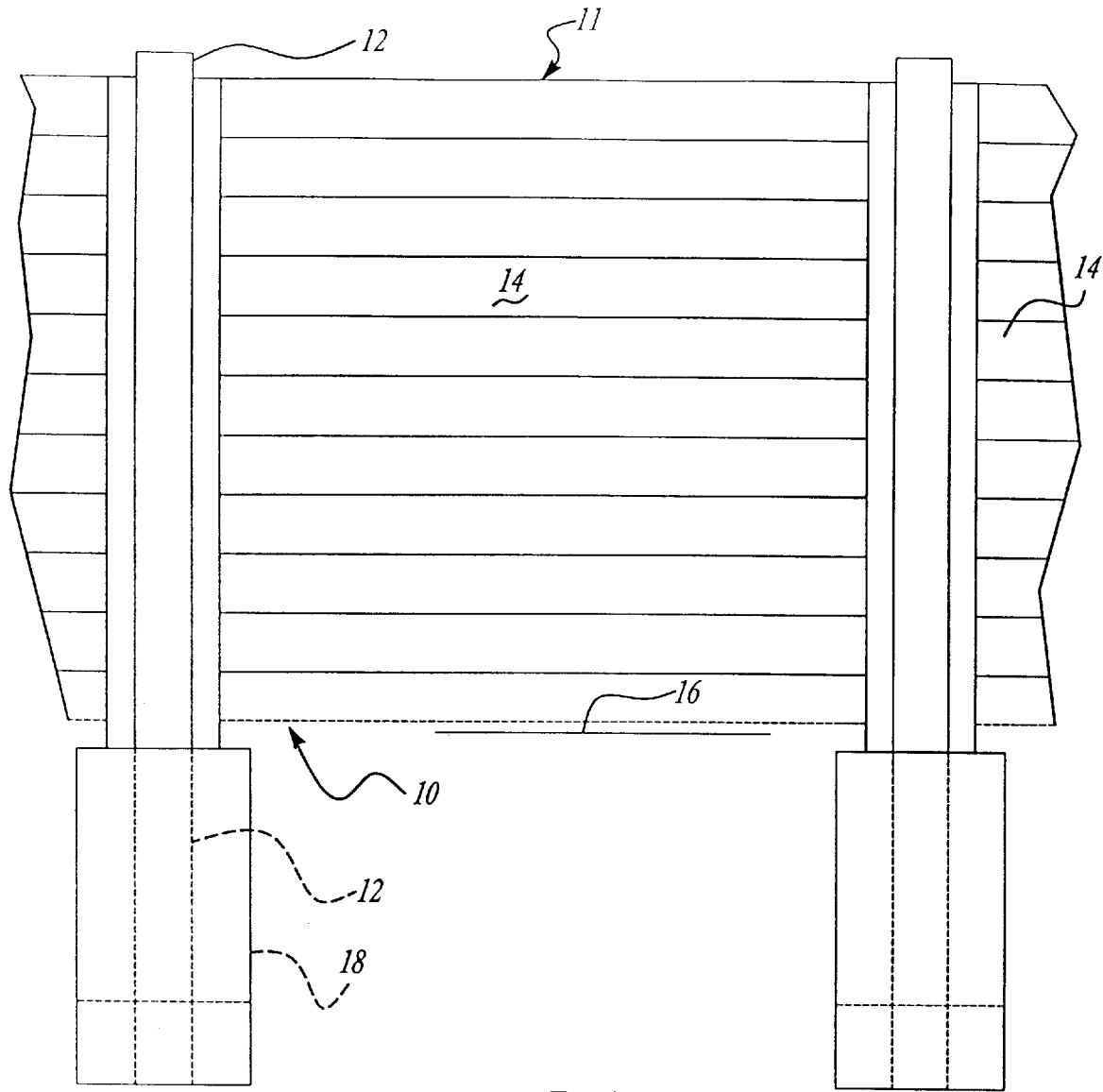
FIG. 1 is a fragmentary front view of part of the vertical wall structure of this invention.

With reference to the drawing, the vertical wall structure of this invention, indicated generally at 10, is shown in FIG. 1 as including a plurality of posts 12 and panels 14. In FIG. 1, only a section 11 of a complete vertical wall structure 10 is illustrated because the rest of the wall structure is duplicative of what the section 11 shown in FIG. 1.

The posts 12 are embedded in the ground to a depth of at least half of the exposed height of the posts 12. Crushed stone, indicated at 18, is backfilled around the posts 12 to insure stability of the wall structure.

Figure 2:
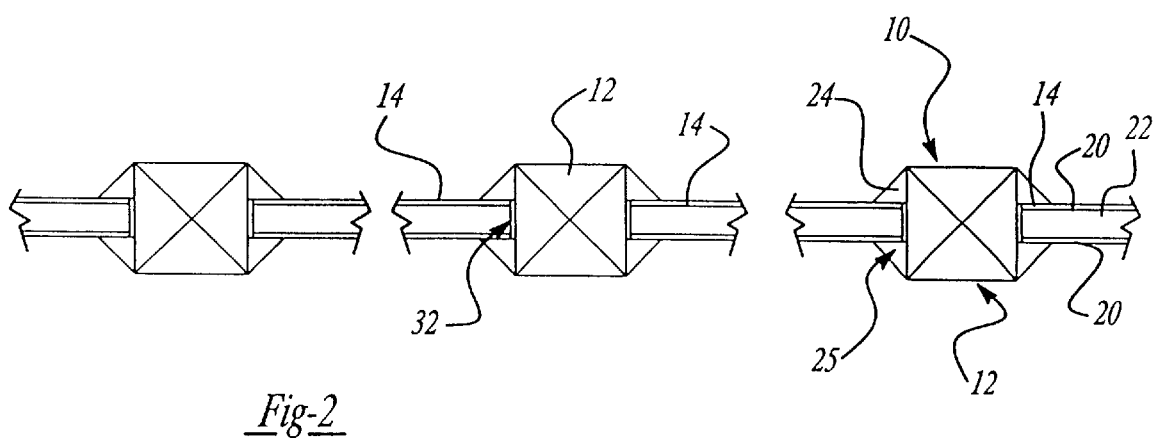
FIG. 2 is a fragmentary top view of the vertical wall structure shown in FIG. 1 with a portion of the wall removed for clarity.

The panels 14 can come in the form of a one-piece full height unit eight feet wide or smaller panels 14 of eight foot length can also be used. Each panel 14 (FIG. 2) is of sandwich construction with pressure treated, exterior rated, plywood siding 20. In between the siding 20 is pressure treated lumber 22 made from long veneer strands of southern pine which are ⅛ inch thick and ½ inch wide and subjected to heat and pressure. The tough plywood siding 20 provides a "stiff structural skin" to enable the panels to resist high wind loads.

Each one of the 4×4 posts 12 is provided with cants 24 and 25 (FIG. 3) which are mounted on faces 26 of the posts 12 that are perpendicular to the panels 14.

Figure 3:
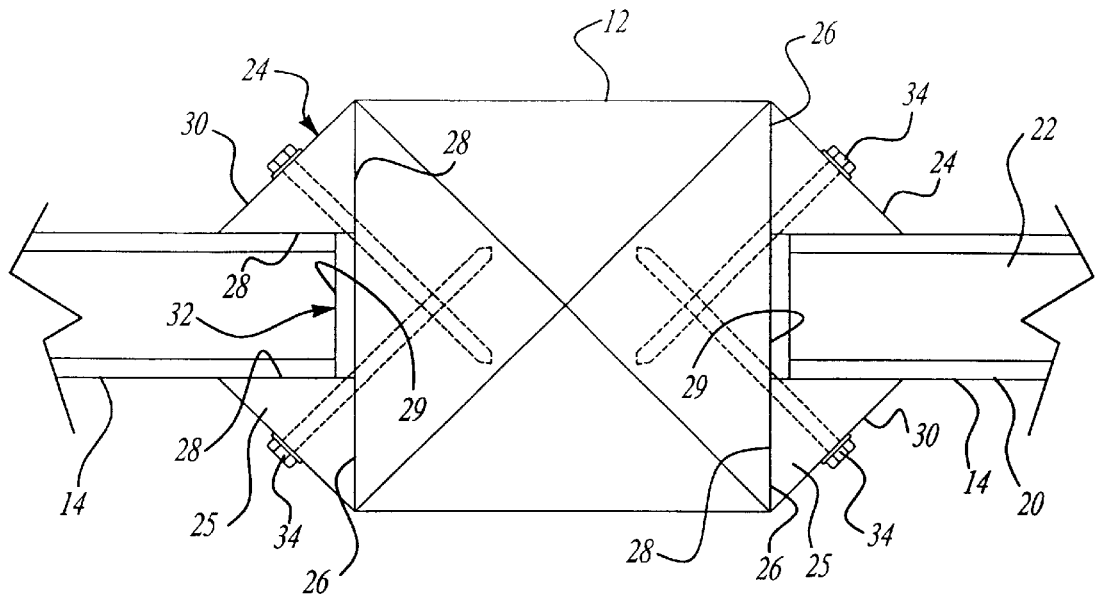
FIG. 3 is a fragmentary top view of a portion of the wall structure shown in FIG. 1 enlarged to show the mounting of the wall panels on a supporting post.

Each cant 24 and 25 is of triangular shape in cross section and extends from the top of the post 12 to the bottom of the panel 14. Each cant 24 and 25 has two right angle sides 28 and a longer hypotenuse side 30. On each face 26 of the post 12, two cants 24 and 25 are spiked in place (FIG. 3). The cants 24 and 25 on each side of the post 12 are spaced apart so as to form a channel 32 running the full length of the post 12 between the cant right angle sides 28. Spikes 34 keep the cants 24 and 25 in stable positions on the post 12.

The unique panel-to-post attachment method using spiked 4×4 cants 24 and 25 to create channels 32 provides an expansion joint and utilizes the exposed post face to add extra linear coverage per panel. The panels 14 are intentionally in a spaced relation with the perpendicular faces 26 on the post 12.

In the assembly of the wall 10, assume that two posts 12 have been set, then one cant 24 is spiked onto each of the posts 12 so that two planar sides 28 face forward. The panel(s) 14 are then swung into position against the planar sides 28 of the cants 24.

The planar sides 28 of the cants 24 create a vertical surface 29. The panel 14 is then placed against the surface 29 and the cants 25 are then placed on the posts 12 in firm engagement with the panel 14. The spikes are then driven through the drill holes in the cants 25 so as to insure that the cants 25 will function to keep the panel 14 in place. Panels 14 do not have to be lowered from the top of the posts 12. Also, holes are predrilled in each cant 24 to receive the spikes 34 which are driven through the cants 24 into the posts 12.

The panels 14 are surprisingly heavy, as each panel weighs 5.5 lbs/sq.ft. and one 12' high panel weighs about 530 lbs. Each panel is made from southern pine particles which have been dried, coated with advanced waterproof adhesives and then compressed and cured to produce exceptionally strong, dimensionally stable wood that is free of the knots and other natural imperfections that limit the strength of sawn lumber.

Figure 4:
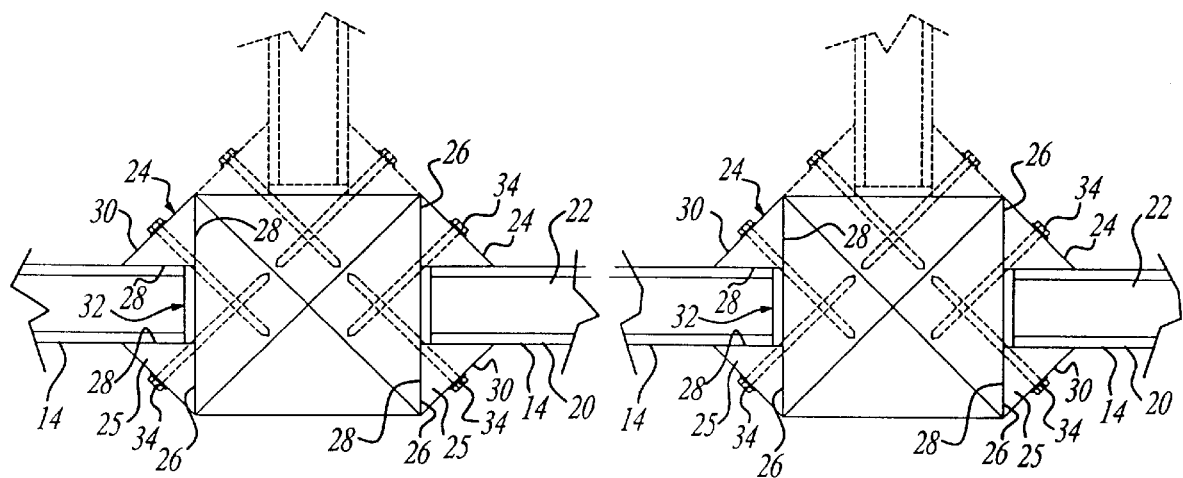
FIG. 4 is a top view of the vertical wall structure of this invention like FIG. 2 showing in broken lines wall panels mounted on the posts in positions perpendicular to the panels shown in FIG. 2.

From the above description, it is seen that this invention provides a simple out-of-doors prefabricated, pre-engineered vertical wall structure that is capable of functioning as a sound barrier or a visual screen. The wall structure is heavy and devoid of openings which would weaken the entire wall structure. The wall can be of an desirable height and of any desirable length and configuration. As shown in FIG. 4, the unique panel-to-post attachment method of this invention can be used to create a wall section that is perpendicular to the wall panels 14.

One major advantage of the wall structure of this invention is that it is completely relocatable. This feature enables the wall structure to be utilized on a construction project where the wall can be moved as the work progresses, and it is an advantage on highway projects where future widening may require the wall structure to be moved.

Attachment of the cants 24 and 25 with hot-dipped galvanized lag bolts instead of spikes allows damage free removal of cants and panels. Posts 12, when set in crushed stone, can be pulled without damage for reuse. None of the components are damaged or destroyed during removal.

What is claimed is:

1. A out-of-doors prefabricated, pre-engineered vertical wall structure constructed entirely of pressure treated wood capable of functioning as a sound barrier and/or a visual screen, said wall structure being comprised of successive individual wall sections tightly arranged in an end-to-end pattern, means joining immediately adjacent wall sections together end-to-end and occupying the entire space between the sections so that adjacent wall sections are devoid of noise leaks, said means comprising upright timber posts having below and above ground portions located one post between each pair of immediately adjacent wall sections, each of said posts being rectangular in cross section and having flat surfaces facing the ends of immediate adjacent wall sections on opposite sides of said post, upright pairs of spaced cants secured to said flat surfaces so as to form upright channels extending upwardly from above the below ground section to the upper ends of the posts, each pair of said cants being spaced apart to receive one end of one of said wall sections in a tight relation between said cants, each of said cants having two similar right angle sides and a bigger hypotenuse side, one of said right angle sides abutting a flat surface on the adjacent post and the other right angle side abutting an adjacent surface on the wall section closest to the adjacent post, a pair of said cants being so mounted on each post as to form said channels.

2. The out-of-doors wall structure as set forth in claim 1 wherein each of said wall sections is comprised of at least one panel mounted on two adjacent posts, said posts having a pair of said cants on said spaced posts so that the cants present a support surface consisting of one of the right angle sides of both of the cants on said posts, said panel being positioned against said surface and another pair of said cants securely mounted on said two posts and engaging said panel so as to hold the panel tightly between said pairs of cants, said other cants being maintained in firm engagement with said posts by spikes driven through the cants into the posts.

* * * * *